(12) United States Patent
Powell, II et al.

(10) Patent No.: US 6,571,083 B1
(45) Date of Patent: May 27, 2003

(54) METHOD AND APPARATUS FOR AUTOMATIC SIMULCAST CORRECTION FOR A CORRELATION DETECTOR

(75) Inventors: Clinton C Powell, II, Lake Worth, FL (US); James David Hughes, Boynton Beach, FL (US); Chun-Ye Susan Chang, Boynton Beach, FL (US); Christopher T. Thomas, Fort Lauderdale, FL (US); Mahibur Rahman, Lake Worth, FL (US); Edgar Herbert Callaway, Jr., Boca Raton, FL (US); James A. Kimball, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/306,663

(22) Filed: May 5, 1999

(51) Int. Cl.[7] .............................. H04B 1/00; H04B 7/00
(52) U.S. Cl. .................. 455/69; 455/232.1; 455/234.2; 375/346
(58) Field of Search ........................... 455/68, 69, 502, 455/503, 232.1–234.2, 254, 303, 296; 375/346

(56) References Cited

U.S. PATENT DOCUMENTS

| 5,208,833 | A | | 5/1993 | Erhart | 375/20 |
| 5,734,974 | A | * | 3/1998 | Callaway et al. | 455/234.1 |
| 5,754,586 | A | * | 5/1998 | Carsello | 375/213 |
| 5,873,044 | A | * | 2/1999 | Goldberg et al. | 455/503 |
| 6,055,436 | A | * | 4/2000 | Powell et al. | 455/503 |
| 6,078,801 | A | * | 6/2000 | Souissi | 455/303 |
| 6,178,210 | B1 | * | 1/2001 | Craig et al. | 375/346 |

* cited by examiner

Primary Examiner—Thanh Cong Le
Assistant Examiner—Stephen D'Agosta
(74) Attorney, Agent, or Firm—Randi L. Dulaney

(57) ABSTRACT

An automatic simulcast correction method (300) for a selective call receiver (100) includes the steps of measuring a received signal (304) for a received signal strength indication measurement and then determining if a protocol indicates a simulcast signal (310). If the received signal strength indication measurement is above a predefined threshold and the protocol indicates the simulcast signal, then the selective call receiver is optimized for simulcast delay spread distortion (312). If the received signal strength indication measurement is below a predefined threshold or the protocol does not indicate the simulcast signal, then the selective call receiver is optimized for static sensitivity (314).

19 Claims, 5 Drawing Sheets

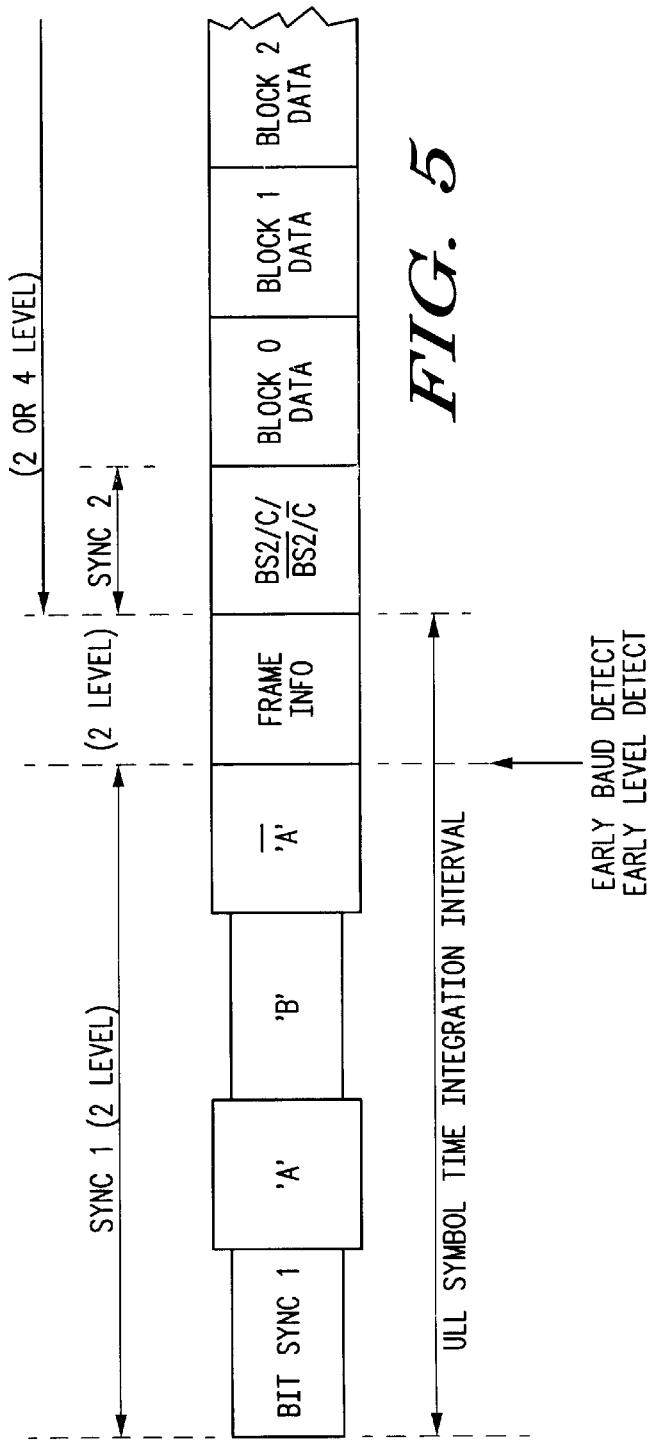

METHOD AND APPARATUS FOR AUTOMATIC SIMULCAST CORRECTION FOR A CORRELATION DETECTOR

FIELD OF THE INVENTION

The present invention is directed to a method in a communication device, such as a selective call receiver, and more particularly to a communication device capable of optimizing reception of simulcast and non-simulcast signals.

BACKGROUND OF THE INVENTION

When designing a communications system, it is often desired to cover an area larger than can be economically covered by a single transmitter site. In such cases, multiple transmitter sites are employed, each transmitting substantially the same data on substantially the same channel, in a process known as simulcasting. Due to differences in propagation delays and other factors, a receiver in the coverage area may receive signals from two or more transmitters at slightly different times, leading to a form of distortion known as Simulcast Delay Spread (SDS) distortion. Under certain conditions this distortion may become severe and corrupt the received data to an unacceptable degree.

Receiver modifications to reduce the effects of SDS distortion are known in the art; however, these modifications tend to degrade static (i.e., non-simulcast) sensitivity, adjacent channel selectivity, or other desirable receiver performance parameters. Conversely, methods of optimizing the receiver to achieve maximum static sensitivity tend to degrade the receiver's performance in the presence of SDS distortion.

Since it is difficult to simultaneously optimize a receiver for best SDS distortion and static sensitivity performance, a need exists for a method which can reliably discern between a simulcast and static channel at a receiver. Additionally, while it is well known that simulcast reception is predominantly a strong signal phenomenon, simulcast reception can occur in weaker signaling conditions as well. When the signal levels of the individual paths that combine to cause the simulcast distortion are strong (20–30 dB or more above the static sensitivity threshold), an error floor exists when the differential delay between paths (which causes a beat note effect) is as small as ¼ of a symbol period. However, if the signal levels of the individual paths are not sufficiently above the static sensitivity threshold, then the composite signal can fall below the static sensitivity threshold for relatively long periods of time causing the error rate to go well beyond the strong signal error floor and the error correction capability. Therefore, since in optimizing the demodulator for simulcast conditions usually results in a loss of static sensitivity, doing so at lower signal levels would not be as advantageous as doing so at higher signaling levels. Thus, the need to reliably determine when simulcast optimization will not degrade static sensitivity performance below an acceptable threshold should preferably include an accurate signal strength level test. Likewise, a need to reliably determine when static sensitivity optimization will not degrade simulcast performance below an acceptable threshold should include a probe of the modulation characteristics of the signal being received. If this were available, an adaptable receiver optimized for static sensitivity could be used that employed SDS distortion mitigation methods only when in a simulcast environment, and therefore achieve optimum performance in both static and simulcast environments.

BRIEF DESCRIPTION OF THE DRAWINGS

FIG. 5 is a timing diagram for a protocol in accordance with the present invention.

FIG. 6 is a chart illustrating simulcast decisions in accordance with the present invention.

DESCRIPTION OF A PREFERRED EMBODIMENT

Figure 1:
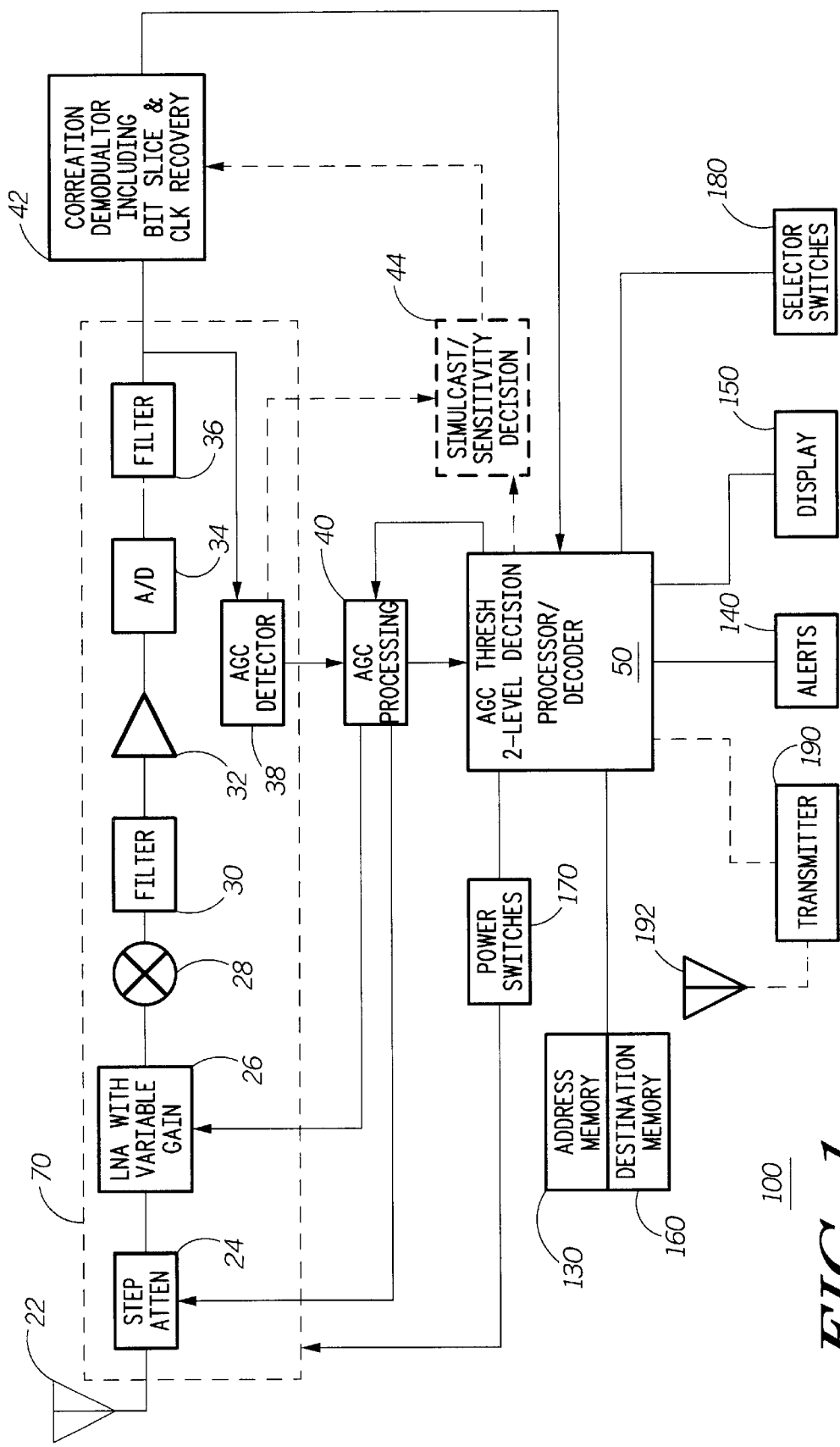
FIG. 1 is a block diagram of a selective call receiver including an automatic simulcast correction circuit in accordance with the present invention.

FIG. 1 illustrates a selective call receiver 100 (or transceiver) utilizing a method of automatic simulcast correction in accordance to the present invention. The simulcast correction can be achieved prior or during signal detection by determining early whether the received signal indicates a simulcast signal. It should be understood herein that "indicates" or "indicating" a simulcast signal does not necessarily mean that the signal is actually received in a simulcast environment. "Indicating" a simulcast signal more so in the context of the present invention signifies that a correlator should operate in a simulcast mode. In the FLEX® paging protocol, a signal having a higher data rate and/or increased number of modulation levels will be more susceptible to the degrading effects seen in the overlap coverage zones resulting from simulcast transmissions. Conversely, a FLEX® signal having a lower data and/or lower number of modulation levels will be less susceptible to the degrading effects seen in the overlap coverage zones resulting from simulcast transmissions. It should also be understood that at a minor expense in static sensitivity performance, a receiver arranged and constructed in accordance with the present invention may operate within acceptable tolerance levels in a simulcast mode in strong signal conditions regardless of whether the actual signal received is at a slow or fast data rate. It should also be noted that a receiver arranged and constructed in accordance with the present invention already in a static sensitivity mode preferably remains in the static sensitivity mode at slow data rates regardless of the level of signal strength (unless signal strength is the only factor considered in making the determination).

One way of determining early whether a received signal indicates simulcast is from determining received signal strength. In this case, an Automatic Gain Control Detector (AGC) 38 within a receiver block 70 is used along with an AGC processing element 40 and processor/decoder 50 to provide a received signal strength indication. If the received signal strength is above a predetermined threshold (AGC THRESH), this provides a good indication of a strong signal and that a correlation demodulator 42 would best operate in a simulcast mode. If the signal is below AGC THRESH, then the correlation demodulator 42 would best operate in a sensitivity mode. Alternatively, another way of determining early whether the received signal indicates a simulcast signal involves the initial detection of a protocol that would have certain characteristics identifying it as a simulcast signal, preferably achieved in the processor/decoder 50. In the case of detecting a signal encoded with the FLEX® protocol, an indication that the received signal is a simulcast signal would typically include the characteristics of having a higher baud rate such as 3200 baud (versus 1600 baud) and more modulation levels such as 4 levels (versus 2). Another protocol or a modified version of the FLEX® may even include a predetermined bit that can indicate if the receiver should operate in a simulcast mode. Thus, the selective call receiver can adjust (or optimize) for either a simulcast signal or a non-simulcast signal during or before detection by either detecting received signal strength or by obtaining an early indication of the protocol characteristics (such as baud rate and type of modulation). Ideally, both techniques (using signal strength and protocol characteristics) can be used to corroborate the indication of a simulcast or non-simulcast signal. This will provide a higher probability that the receiver is appropriately and correctly optimized.

The selective call receiver 100 preferably comprises a receiver block 70 for receiving RF signals detected by antenna 22. The receiver block 70 preferably includes a step attenuator 24 coupled to the antenna 22 and a low noise amplifier with variable gain 26. Both attenuator 24 and amplifier 26 are preferably controlled by the AGC processing element 40 for signal scaling purposes. The receiver block 70 further preferably comprises a mixer 28 coupled to the amplifier 26 as well as a filter 30, an amplifier 32, an analog to digital converter 34 and another filter 36 coupled to the AGC detector 38. The processor/decoder 50 preferably assists in directing the AGC processing and determining the level of gross attenuation required by the step attenuator 24 and the fine attenuation provided by the variable gain amplifier 26. Based on the signal strength determination from the AGC processing element 40 and/or the protocol characteristics determinations, the processor/decoder 50 as well as the AGC detector can provide a simulcast distortion/static sensitivity mode decision element 44 with sufficient data to make a decision how to optimize the correlation demodulator 42. It should be understood that the correlation demodulator preferably includes a bit slicer and clock recovery elements.

The processor/decoder 50 preferably serves as a controller which may include a decoder function that preferably decodes digital data in accordance with protocol rules established for example, by Motorola's FLEX® paging protocol. The processor 50 is the control point for the selective call receiver 100. Among other things, the processor 50 may control the receiver block 70 and a transmitter 190. The processor 50 compares received address information with predetermined addresses stored in the address memory 130 in order to trigger one of the alerts 140 or to display a received text or graphics message on display 150. In addition, messages are stored in a destination memory 160. The processor 50 also is connected to a power switch 170 to shut down the receiver block 70 and other components of the selective call receiver 100 during periods of time when the particular selective call receiver is not expected to receive information. A user interface to the selective call receiver 100 is achieved through selector switches 180. The selective call receiver may also have acknowledge-back or reverse channel transmitting capability, and accordingly may comprise the transmitter 190 and a transmitting antenna 192.

Figure 2:
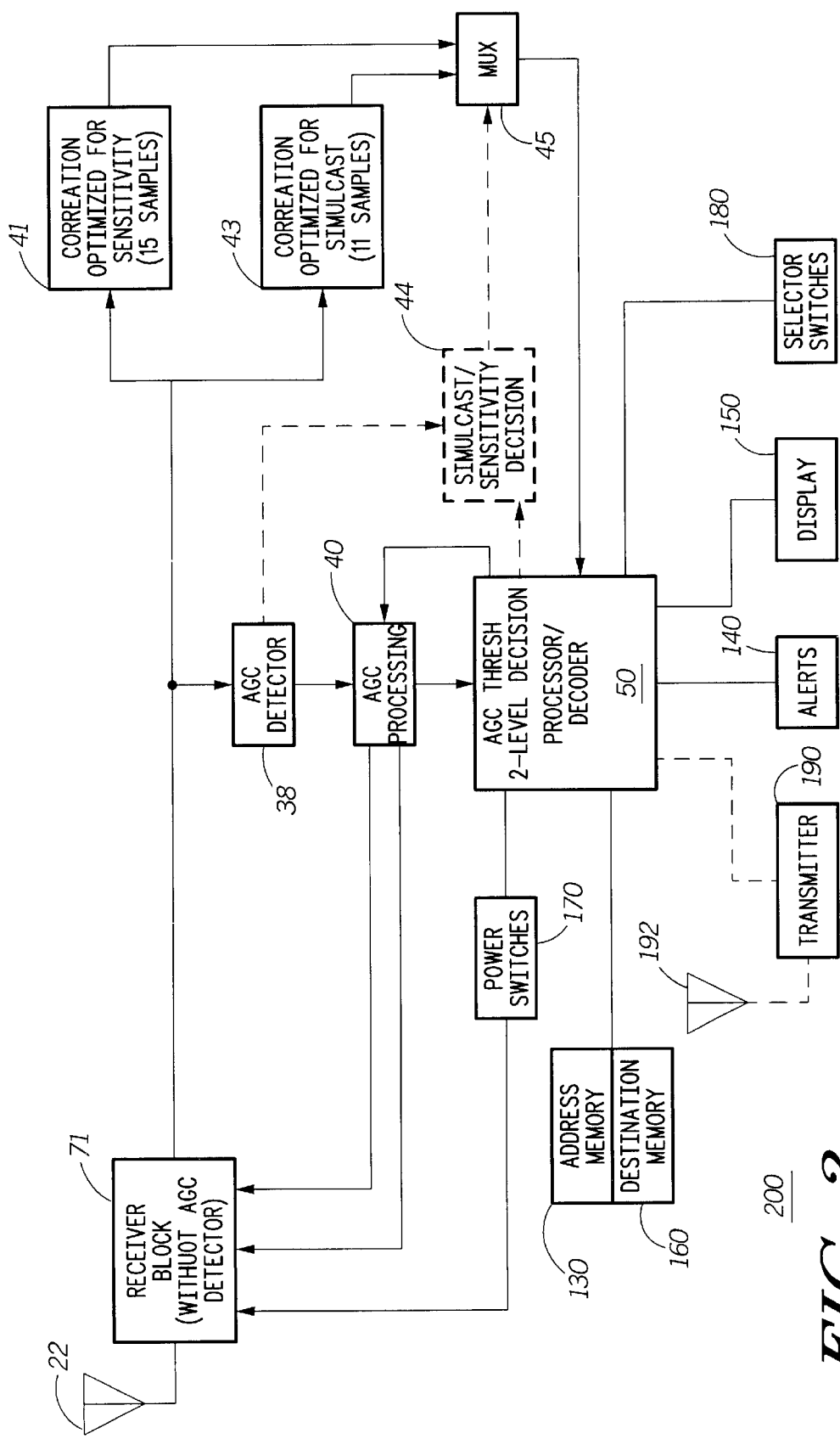
FIG. 2 is a block diagram of another selective call receiver including an automatic simulcast correction circuit with parallel correlation paths in accordance with the present invention.

Referring to FIG. 2, a selective call receiver 200 (or transceiver) is shown similar to the selective call receiver 100 of FIG. 1 with the further refinement of having a dual correlation path with a correlator 41 optimized for sensitivity on one path and another correlator 43 optimized for simulcast signals on another path. In this case, an Automatic Gain Control Detector (AGC) 38 resides outside a receiver block 71 which is used along with an AGC processing element 40 and processor/decoder 50 to provide a received signal strength indication. The receiver block 71 receives RF signals detected by the antenna 22. As explained above, if the received signal strength is above a predetermined threshold (AGC THRESH), this provides a good indication of a simulcast signal. If the signal is below AGC THRESH, then a simulcast decision block 44 would chose to operate the receiver 200 in a sensitivity mode by having a multiplexer 45 select the correlator 41 optimized for sensitivity. Alternatively, as previously explained, another way of determining early whether the received signal indicates a simulcast signal involves the initial detection of a protocol that would have certain characteristics identifying it as a simulcast signal, preferably achieved in the processor/decoder 50. Thus, the selective call receiver can adjust (or optimize) for either a simulcast signal or a non-simulcast signal during or before detection by either detecting received signal strength or by obtaining an early indication of the protocol characteristics (such as baud and level detection or a predetermined bit setting). Ideally, both techniques (using signal strength and protocol characteristics) can be used to corroborate the indication of a simulcast or non-simulcast signal. This will provide a higher probability that the receiver is appropriately and correctly optimized. Although the dual correlation paths require more hardware and processing, this implementation will allow for faster decoding of the signals once detected. The remainder of the elements in the receiver 200 including the transmitter 190, the address memory 130, the destination memory 160, the alerts 140, the display 150, the power switch 170, and the selector switches 180 would essentially operate and couple to the processor 50 as described with reference to the receiver 100 of FIG. 1.

Ideally, a method in accordance with the present invention can perform simulcast correction in a variety of ways wherein the receiver can be optimized for both simulcast delay spread or receiver sensitivity. In a first embodiment, the present invention may just use received signal strength to adjust the correlator demodulator. In a second embodiment, the present invention may just use early protocol characteristics detected from the signal to adjust the correlator. In yet a third embodiment, the present invention may use both the received signal strength indication and the protocol characteristics to provide a higher probability that the adjustment to the correlator is the appropriate one.

Figure 3:
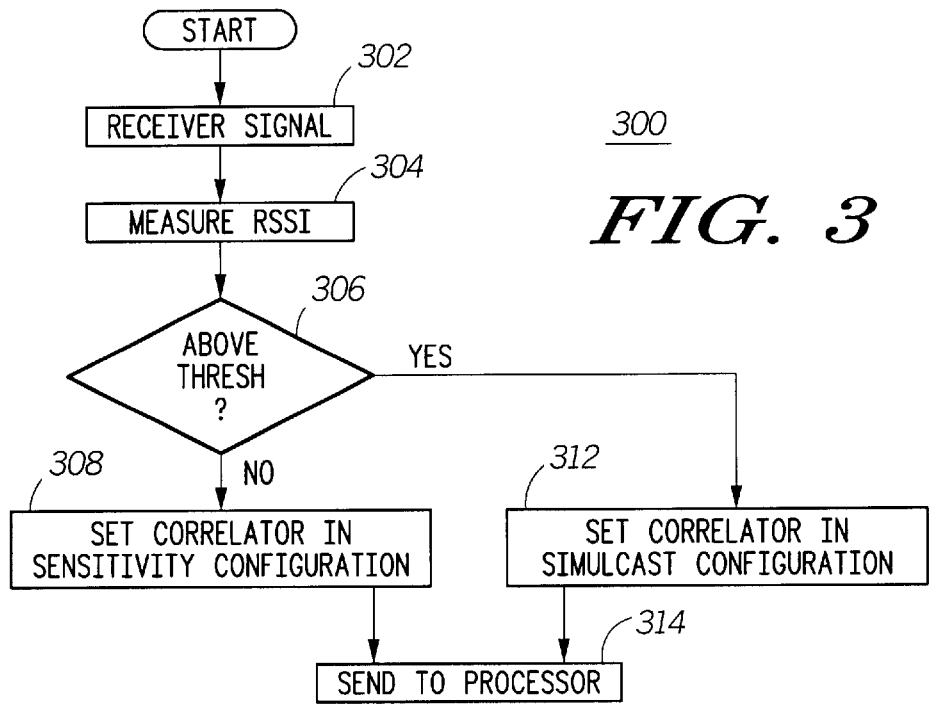
FIG. 3 is a flow chart illustrating a method of automatic simulcast correction in accordance with the present invention.

Referring to FIG. 3, a flow chart illustrating a method 300 for automatic simulcast correction for a selective call receiver is shown. Initially, the receiver receives a signal at step 302. In the first embodiment, the automatic simulcast correction method 300 then measures a received signal at step 304 for a received signal strength indication measurement (RSSI). Part of the measuring step may include the step of scaling the received signal by adjusting at least one attenuator within the detector in response to an automatic gain controller signal which may include the steps of adjusting a step attenuator and a variable gain amplifier. At decision block 306, if the received signal strength indication measurement is above a predefined threshold, then a detector (correlation demodulator) in the selective call receiver is optimized for simulcast delay spread at step 312. If the received signal strength indication measurement at step 306 is below a predefined threshold, then the detector in the selective call receiver is optimized for static sensitivity at step 308. Optimizing the detector for sensitivity or simulcast can involve altering an integration window (in a symbol detector or correlation demodulator). The processor can be programmed to adjust the integration window to a full symbol time of samples in a receiver sensitivity mode or to adjust the integration window to a less than full symbol time of samples in a simulcast delay spread mode. For example, in the FLEX® protocol, a received signal may be optimized for sensitivity when correlation of 15 out of 15 samples of a FLEX® symbol time are taken, whereas a simulcast signal is optimized using only 11 out of 15 samples of a symbol time. After the detector is either optimized for sensitivity or simulcast, then the signal can be sent to the processor 50 at step 314.

Figure 3A:
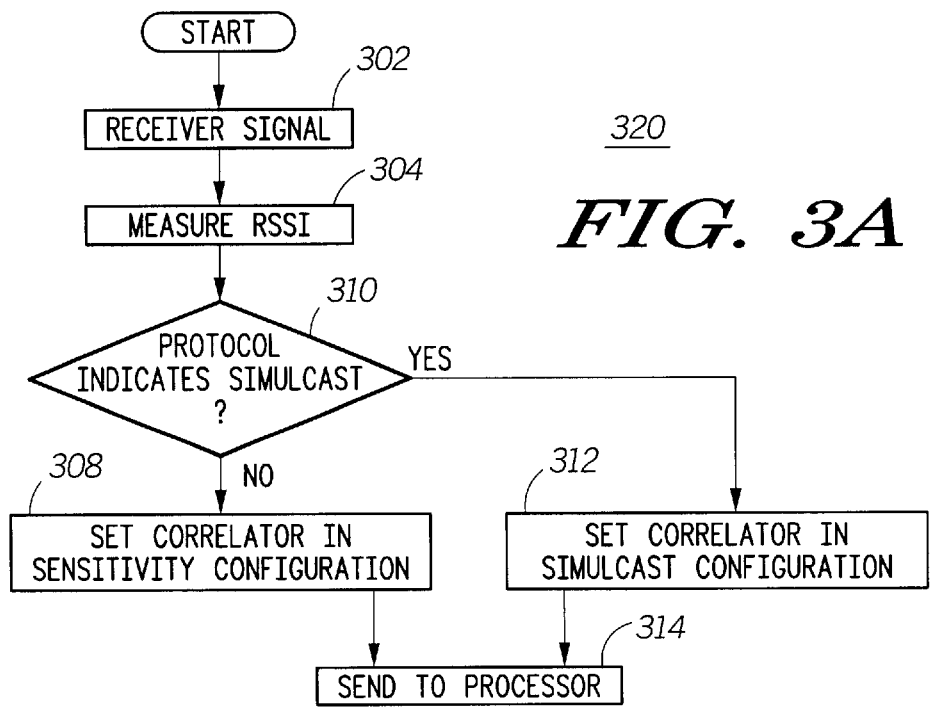

In the second embodiment, the automatic simulcast correction method 320 shown in FIG. 3A can skip the RSSI measurement at step 304 and merely determine if a protocol indicates a simulcast signal at decision block 310. The term "indicates" does not necessarily mean that a simulcast signal is actually being received, but merely that there is a good probability that a simulcast signal is being received. If the protocol indicates the simulcast signal at decision block 310, then the selective call receiver is optimized for simulcast delay spread at block 312. If the protocol fails to indicate the simulcast signal at decision block 310, then the selective call receiver is optimized for sensitivity at block 308. The step of determining if a protocol indicates a simulcast signal preferably comprises determining whether a modulation type is a two or a greater than two level signal or whether a data field indicates a faster or slower data rate (baud rate).

Figure 3B:
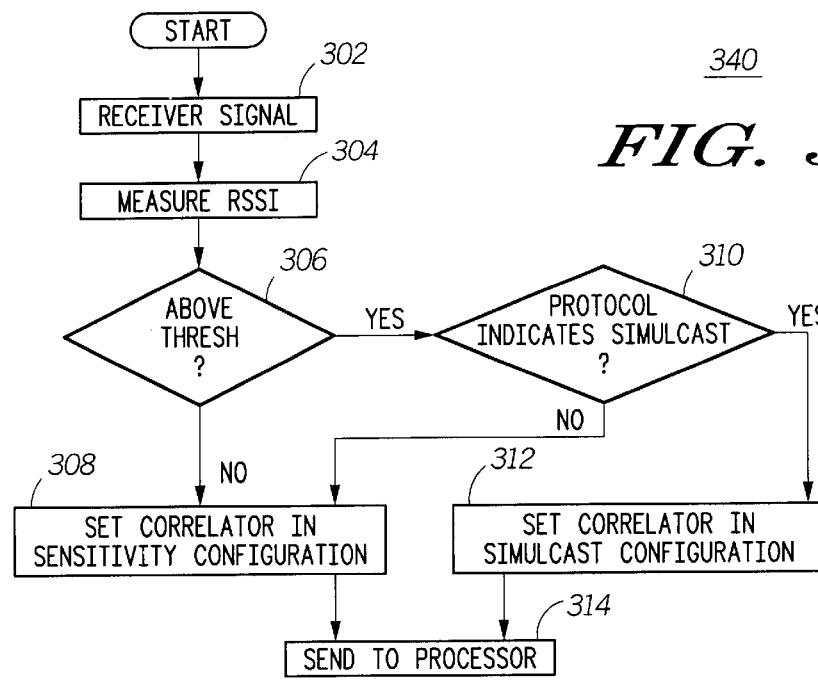

In the third embodiment, the automatic simulcast correction method 340 shown in FIG. 3B measures a received signal at step 304 for a received signal strength indication measurement (RSSI). If the received signal strength indication measurement at step 306 is below a predefined threshold, then the detector in the selective call receiver is optimized for receiver sensitivity at step 308 and the received data is subsequently displayed at step 314. If the received signal strength indication measurement is above a predefined threshold at decision block 306, then the method 340 will further determine if a protocol indicates a simulcast signal at decision block 310. If the protocol indicates the simulcast signal at decision block 310, then the selective call receiver is optimized for simulcast delay spread at block 312 and then the received data is subsequently displayed at step 314. If the protocol fails to indicate the simulcast signal at decision block 310, then the selective call receiver is optimized for sensitivity at block 308.

Figure 4:
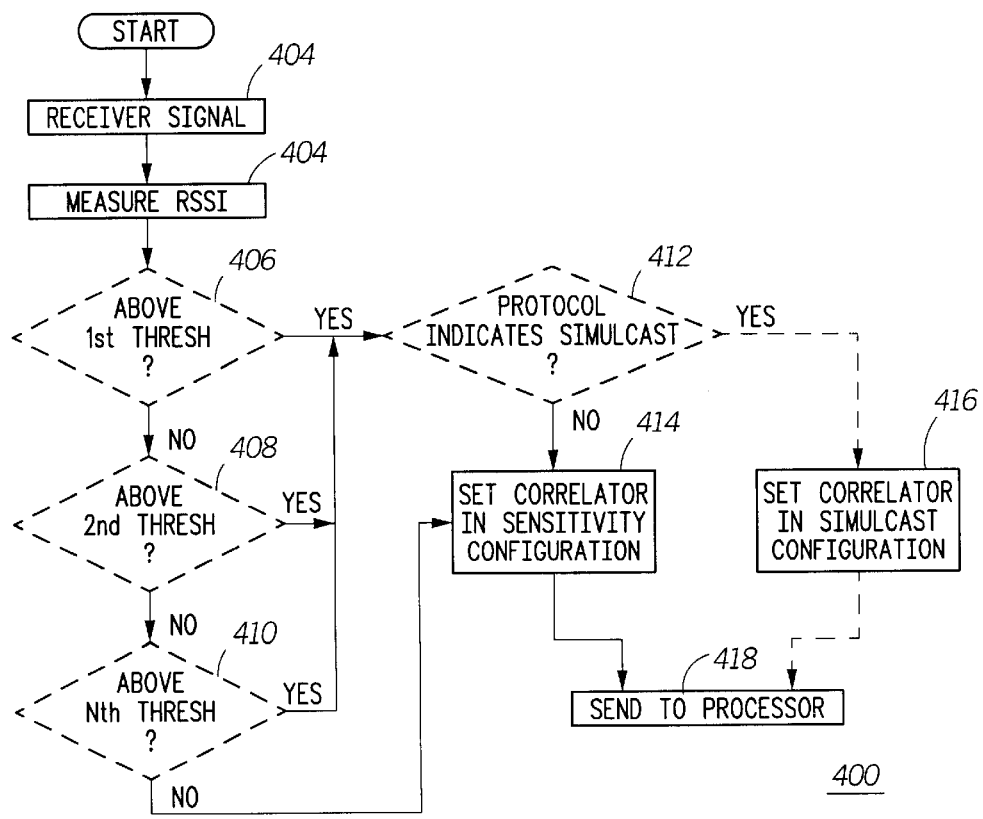
FIG. 4 is a flow chart illustrating another method of automatic simulcast correction in accordance with the present invention.

Referring to FIG. 4, a further alternative method 400 of automatic simulcast correction is shown where received signal strength is primarily used to make the determination of adjusting a correlator for static sensitivity or simulcast. First, the signal is received at step 402. Then, the received signal strength is measured at step 404. Then, a series of signal strength tests (decision blocks 406, 408, and 410) are sequentially performed for an incoming signal, wherein if a first of the signal strength tests (406) passes a first threshold, then a remainder of the series of signal strength tests are skipped and wherein if the first of the signal strength tests fails to meet the first threshold, then subsequent signal strength tests (408, 410, etc.) can be performed for testing signal strength at lower thresholds. The correlator will be set in a sensitivity configuration when the signal strength test (or series of tests) fails to meet a lowest threshold. The result of the series of signal strength tests can be used solely to make the correlator adjustments or the result of the series of signal strength test can be logically ANDed with a result of a protocol simulcast indication decision 412 to provide an automatic simulcast correction decision. The method may further provide an automatic simulcast correction decision which includes choosing one of two parallel correlator paths wherein one correlator path is optimized for receiver sensitivity and a second correlator path is optimized for simulcast delay spread.

Referring to FIG. 5, there is shown a timing diagram of the FLEX® protocols. To seek an indication that the protocol being received is simulcast, an early determination of the baud rate or data rate and an early determination of the symbol levels can be found after sync 1 and within the FRAME INFORMATION word. FIG. 6 illustrates a chart for FLEX® where simulcast decisions are made in accordance with the present invention. The simulcast decision may vary based on the protocol being received, but each protocol should give certain indications that the transmission is simulcast without having to decode the subsequent data transmitted (DATA BLOCKS 0, 1, 2, etc.). Referring to FIGS. 4 and 5, the first three signal strength tests based on three separate thresholds preferably occur during an AGC warmup period. The AGC warmup period typically occurs before Bit Sync 1 in the FLEX® protocol. The warmup period may even occur within a portion of the Bit Sync 1 time slot. Alternatively, a signal strength test could occur as late as the end of the Frame Information Word which may be used in a decision to set the correlator in a simulcast or sensitivity configuration. Of course, other variations within the scope of the present invention are contemplated including varieties that differ in where and how the signal strength test or tests occur or even differ in the inherent protocol characteristics used to make the optimization decisions herein.

The above description is intended by way of example only and is not intended to limit the present invention in any way except as set forth in the following claims.

What is claimed is:

1. An automatic simulcast correction method for a selective call receiver that can be optimized for both simulcast delay spread distortion and static sensitivity, the method comprising the steps of:

measuring a received signal for a received signal strength indication measurement;

determining if a protocol indicates a simulcast signal including determining whether a modulation field is a two level signal or a greater than two level signal;

if the received signal strength indication measurement is above a predefined threshold and the protocol indicates the simulcast signal, then optimizing the selective call receiver for simulcast delay spread distortion; and if the received signal strength indication measurement is below a predefined threshold or the protocol does not indicate the simulcast signal, then optimize the selective call receiver for static sensitivity.

2. The method of claim 1, wherein the step of optimizing the selective call receiver comprises optimizing a detector in the selective call receiver.

3. The method of claim 1, wherein the step of measuring the received signal comprises the step of scaling by adjusting at least one attenuator within the selective call receiver in response to an automatic gain controller signal.

4. The method of claim 3, wherein the at least one attenuator is within a detector of the selective call receiver.

5. The method of claim 3, wherein the step of adjusting at least one attenuator comprises the step of adjusting a step attenuator and a variable gain stage.

6. The method of claim 1, wherein the step of optimizing the selective call receiver comprises the step of altering an integration window.

7. The method of claim 6, wherein the step of optimizing the selective call receiver comprises optimizing a detector within the selective call receiver.

8. The method of claim 1, wherein the step of optimizing the detector further comprises the step of choosing one of two parallel correlator paths wherein one correlator path is optimized for static sensitivity and a second correlator path is optimized for simulcast delay spread distortion.

9. A method for automatic simulcast correction for a correlation detector, comprising the steps of:

sequentially performing a series of signal strength tests for an incoming signal, wherein if a first of the signal strength tests passes a first threshold, then a remainder of the series of signal strength tests are skipped and wherein if the first of the signal strength tests fails to meet the first threshold, then a subsequent signal strength test is performed for testing signal strength at a lower threshold; and logically AND a result of the series of signal strength tests with a result of a protocol simulcast indication decision, wherein the protocol simulcast indication decision includes a decision of whether a modulation type is a two or a greater than two level signal, to provide an automatic simulcast correction decision, wherein the series of signal strength tests fails when the incoming signal fails to meet a lowest threshold.

10. The method of claim 9, wherein the step of providing the automatic simulcast correction decision further comprises the step of adjusting at least one attenuator within a detector in response to an automatic gain controller signal.

11. The method of claim 10, wherein the step of adjusting at least one attenuator comprises the step of adjusting a step attenuator and a variable gain stage.

12. The method of claim 9, wherein the step of providing the automatic simulcast correction decision comprises the step of altering an integration window.

13. The method of claim 9, wherein the step of providing the automatic simulcast correction decision further comprises the step of choosing one of two parallel correlator paths wherein one correlator path is optimized for static sensitivity and a second correlator path is optimized for simulcast delay spread distortion.

14. An automatic simulcast correction method for a selective call receiver that can be optimized for both simulcast delay spread distortion and static sensitivity, the method comprising the steps of:

determining if a protocol indicates a simulcast signal including determining whether a modulation type is a two or a greater than two level signal;

if the protocol indicates the simulcast signal, then optimizing the selective call receiver for simulcast delay spread distortion; and if the protocol fails to indicate the simulcast signal, then optimizing the selective call receiver for static sensitivity.

15. The method of claim 14, wherein the step of optimizing the selective call receiver comprises the step of altering an integration window in a detector within the selective call receiver.

16. The method of claim 14, wherein the step of optimizing the selective call receiver further comprises the step of choosing one of two parallel correlator paths wherein one correlator path is optimized for static sensitivity and a second correlator path is optimized for simulcast delay spread distortion.

17. A selective call receiver unit capable of being optimized for either simulcast delay spread distortion or static sensitivity, comprising a selective call receiver having a received signal strength indicator;

a correlator coupled to the selective call receiver wherein the correlator has an adjustable integration window; and a processor coupled to the correlator, wherein the processor is programmed to:

measure a received signal for a received signal strength indication measurement through the received signal strength indicator;

determining if a protocol indicates a simulcast signal including determining whether a modulation field is a two level signal or a greater than two level signal;

if the received signal strength indication measurement is above a predefined threshold and the protocol indicates the simulcast signal, then adjust the integration window for simulcast delay spread distortion; and if the received signal strength indication measurement is below a predefined threshold or the protocol does not indicate the simulcast signal, then adjust the integration window for static sensitivity.

18. The selective call receiver unit of claim 17, wherein the processor is programmed to adjust the integration window to a full symbol time of samples in a static sensitivity mode and to further adjust the integration window to a less than full symbol time of samples in a simulcast delay spread distortion mode.

19. The selective call receiver of claim 17, wherein the received signal strength indicator comprises an automatic gain controller and associated processing which is used to adjust attenuators within the selective call receiver.

* * * * *